(12) United States Patent
Violas de Oliveira e Sá

(10) Patent No.: US 12,173,433 B2
(45) Date of Patent: Dec. 24, 2024

(54) AGRICULTURAL MESH FOR BALING

(71) Applicant: COTESI—COMPANHIA DE TÊXTEIS SINTÉTICOS, S.A., Grijó (PT)

(72) Inventor: Pedro Américo Violas de Oliveira e Sá, Grijó (PT)

(73) Assignee: COTESI—COMPANHIA DE TÊXTEIS SINTÉTICOS, S.A., Grijó (PT)

( * ) Notice: Subject to any disclaimer, the term of this patent is extended or adjusted under 35 U.S.C. 154(b) by 600 days.

(21) Appl. No.: 16/975,501

(22) PCT Filed: Feb. 26, 2019

(86) PCT No.: PCT/PT2019/000002
§ 371 (c)(1),
(2) Date: Aug. 25, 2020

(87) PCT Pub. No.: WO2019/172791
PCT Pub. Date: Sep. 12, 2019

(65) Prior Publication Data
US 2021/0032785 A1    Feb. 4, 2021

(30) Foreign Application Priority Data
Mar. 5, 2018   (PT) ......................... 110606

(51) Int. Cl.
*B65D 5/38*    (2006.01)
*A01F 15/07*   (2006.01)
(Continued)

(52) U.S. Cl.
CPC ............. *D04B 21/10* (2013.01); *B65D 65/38* (2013.01); *D04B 1/16* (2013.01); *D04B 21/12* (2013.01);
(Continued)

(58) Field of Classification Search
CPC ....................................................... D04H 1/16
See application file for complete search history.

(56) References Cited

U.S. PATENT DOCUMENTS

| | | | | |
|---|---|---|---|---|
| 3,413,825 A | * | 12/1968 | Winch | D04B 21/10 66/193 |
| 6,521,551 B1 | * | 2/2003 | Mass | D04B 21/12 206/83.5 |

(Continued)

FOREIGN PATENT DOCUMENTS

| | | |
|---|---|---|
| BE | 1006093 | 5/1994 |
| CN | 202738548 | 2/2013 |

(Continued)

OTHER PUBLICATIONS

English Abstract WO 201357597. Apr. 25, 2013 (Year: 2013).*
(Continued)

*Primary Examiner* — Jenna L Johnson
(74) *Attorney, Agent, or Firm* — B. Aaron Schulman, Esq; Stites & Harbison, PLLC

(57) ABSTRACT

An agricultural mesh for baling is provided that contains columns of chains or pillars, wherein each column of chain or pillar has a plurality of meshes interconnected with each other and associated with the columns of chains or pillars by means of the weft, wherein the configuration and dimensions of the weft provides the reinforcement of the agricultural mesh for baling. The present invention provides a solution that aims to reduce the dimensions of the longitudinal openings—weft during the baling process, yielding strong and well-preserved bales.

3 Claims, 5 Drawing Sheets

(51) Int. Cl.
  *B65D 65/38* (2006.01)
  *D04B 1/16* (2006.01)
  *D04B 21/10* (2006.01)
  *D04B 21/12* (2006.01)

(52) U.S. Cl.
  CPC ..... *A01F 15/071* (2013.01); *A01F 2015/0745* (2013.01); *D10B 2505/10* (2013.01)

(56) References Cited

U.S. PATENT DOCUMENTS

| | | |
|---|---|---|
| 6,706,376 B1 | 3/2004 | Von Fransecky |
| 6,840,067 B2 | 1/2005 | Mass et al. |
| 2001/0004572 A1 | 6/2001 | Mass et al. |
| 2005/0215147 A1 | 9/2005 | Masters et al. |
| 2007/0021018 A1 | 1/2007 | Lin et al. |
| 2008/0147198 A1 | 6/2008 | Cherok et al. |

FOREIGN PATENT DOCUMENTS

| | | | |
|---|---|---|---|
| CN | 103841820 | 6/2014 | |
| DE | 3802108 | 8/1988 | |
| EP | 891698 | 1/1999 | |
| EP | 891698 A2 * | 1/1999 | ........... A01F 15/071 |
| EP | 1736583 | 12/2006 | |
| EP | 1786964 | 8/2008 | |
| GB | 2348633 | 10/2000 | |
| JP | 2001352844 | 12/2001 | |
| JP | 2006070398 | 3/2006 | |
| JP | 2007043933 | 2/2007 | |
| JP | 2013139295 | 7/2013 | |
| JP | 2014201706 | 10/2014 | |
| JP | 2015151635 | 8/2015 | |
| KR | 101549186 | 9/2015 | |
| WO | WO-2005039852 | 5/2005 | |
| WO | WO-2013057597 | 4/2013 | |
| WO | WO-2015140657 | 9/2015 | |
| WO | WO-2017190812 | 11/2017 | |
| WO | WO-2018034220 | 2/2018 | |

OTHER PUBLICATIONS

International Search Report dated May 17, 2019 in International Application No. PCT/PT2019/000002.
Written Opinion dated May 17, 2019 in International Application No. PCT/PT2019/000002.
International Preliminary Report on Patentability dated Sep. 8, 2020 in International Application No. PCT/PT2019/000002.
Informal Comment to ISA filed Jul. 12, 2019 in International Application No. PCT/PT2019/000002.
Written Opinion dated May 25, 2018 in Portuguese Application No. 110606.
Notification of Reasons for Refusal dated Jan. 17, 2023 in Corresponding Japanese Application No. JP2020546368.
Notification of Reasons for Refusal dated Jul. 25, 2023 in Corresponding Japanese Application No. JP2020546368.
First Office Action dated Dec. 3, 2021 in Corresponding Chinese Application No. CN 20190015438.8.

* cited by examiner

AGRICULTURAL MESH FOR BALING

FIELD OF THE INVENTION

The present invention relates to an agricultural mesh for baling (1) comprising columns of chains or pillars (3), in which each column of chain or pillar (3) comprises a plurality of meshes (4) interconnected with each other and associated with the columns of chains or pillars (3) by means of the weft (2), wherein the configuration and dimensions of the weft (2) provide the strengthening of the agricultural mesh for baling (1).

BACKGROUND OF THE INVENTION

In recent years there has been an increase demand on the balancing of different features existing in an agricultural mesh, for example, its mechanical ability and stability, as well as the ability to withstand high speeds during the baling process with the objective of producing round and geometrically perfect bales, as well as providing a response to the increase of pressure in the baling process, in view of the insertion of a larger amount of baled product in the same volume. This demand has been increasing and it is related to the need of obtaining a more resistant agricultural mesh that withstands higher pressures resulting from the increasing weight of bales stored in the same volume.

Patent application EP1786964 (2004) discloses a net with longitudinal crimping strips and transverse fastening strips zigzagging laterally between the adjacent longitudinal crimping strips, which form a series of triangular openings in which at least one reflective or luminescent indicator strip is woven or sewn in the net so as to extend over a part of the net length.

Patent application WO2015140657 (2015) discloses a package composed by a net for packaging a material (for example, hay, straw or any other perishable material) applied to the central zone of said material, and by two closure portions at the ends, as well as the corresponding method of packaging such materials.

Patent application EP891698 (1998) discloses a net made of an extensible plastic mesh film, in which the mesh openings have longitudinal yarns running in zigzag between the yarns of the neighboring openings.

Patent GB2348633 (B) discloses a material for agricultural bales, which is composed of a polymer sheet having a reinforcing mesh bonded or fused to at least one surface thereof, the reinforced sheet being able of adhering to itself when wound and overlapped over a bale. In use, the material is wound around a hay mass, or other such material intended to be transformed in a bale, in more than one turn, and thus overlapped over itself. The composite material may comprise such a net sandwiched between two polymer sheets or a single sheet sandwiched between two mesh layers.

There are other alternatives of agricultural mesh in the market, in which the weft has a cross configuration with the objective of improving the strength of the bales (FIG. 5). However, this type of solution uses a larger amount of weft yarn, with higher production costs.

In accordance with the foregoing, there is a need to develop a robust agricultural mesh, which allows to produce round, geometrically perfect and mechanically stable bales, allowing to pack more forage mass in each bale without jeopardizing its robustness.

SUMMARY OF THE INVENTION

The present invention relates to an agricultural mesh for baling (1), comprising columns of chains or pillars (3), in which each column of chain or pillar (3) comprises a plurality of meshes (4) interconnected with each other and associated with the columns of chains or pillars (3) by means of the weft (2), wherein the configuration and dimensions of the weft (2) provide the reinforcement of the agricultural mesh for baling (1).

More particularly, the present invention provides a solution, which aims to reduce the dimensions of the longitudinal openings—weft (2)—during the baling process, resulting in well-preserved bales, unlike damaged or unusable bales produced with known agricultural meshes, due to accidental cutting or breaking of the mesh and consequent bursting when terminating each bale, as well as additional efforts of pressure caused by poor dispersion and lack of uniformity of the bale within the chamber of the baling machine.

In this way, we wish to respond to the increasing pressure increase in the act of baling, in view of the insertion—in the same volume—of a larger amount of baled product (same volume and more weight implies increase of pressure, and thus higher requirements of the agricultural mesh for baling (1)), said product being straw, hay, grass, *Miscanthus* or any other product that can potentially be baled.

Another advantage of the use of the present invention relates to the greater ease and efficiency of transport of the bales covered with the agricultural mesh for baling (1).

The present invention will also be useful for a better bale cover during the baling by reducing or eliminating the uncovered side fringes, which makes difficult the application of stretchable film for fermentation of green herbs or hay. With the reinforcement of the weft (2) an increase in the cover density is also achieved, thus contributing to improve the waterproofing of the bale against humidity, increasing the quality of the forage.

DESCRIPTION

The present invention relates to an agricultural mesh for baling (1) comprising a plurality of columns of chains or pillars (3) interconnected with each other by means of the weft (2) and wherein each column of chain or pillar (3) comprises a plurality of meshes (4).

The columns of chains or pillars (3) that form the agricultural mesh for baling (1) have a distance between them enough to ensure the strength and cohesion of the agricultural mesh for baling (1), during and after the baling.

In one embodiment, the distance between the columns of chains or pillars (3) that form the agricultural mesh for baling (1) is X, wherein X represents the minimum allowable distance between two columns of chains or pillars (3).

In another embodiment, the distance between the columns of chains or pillars (3) that form the agricultural mesh for baling (1) is 2X, wherein 2X represents twice the minimum allowable distance between two columns of chains or pillars (3).

The materials that compose the agricultural mesh for baling (1), subject of the present invention, are selected from the following: high density polyethylene (homopolymer or metallocene), or polypropylene copolymers in a mass fraction up to 20%, or copolymers of polyethylene in a mass fraction up to 20%, or high-density polyethylene with polypropylene homopolymer in a mass fraction up to 20%.

As used herein, the term "columns of chains or pillars (3)" is to be understood as the columns of chains or pillars (3) that form the agricultural mesh for baling (1) of the present invention.

DETAILED DESCRIPTION OF THE INVENTION

Figure 1:
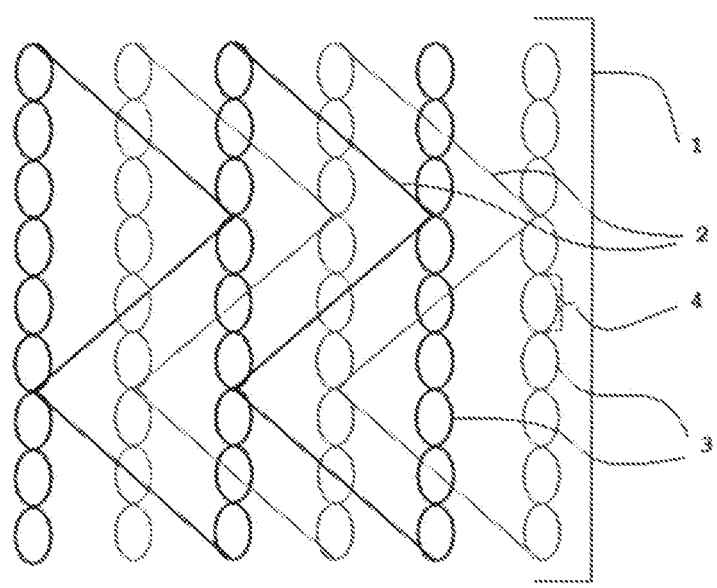
FIG. 1 shows, in a front view of the invention, an agricultural mesh for baling (1) comprising a plurality of meshes (4) interconnected with each other and associated with the columns of chains or pillars (3) by means of the weft (2) that provide the reinforcement of the agricultural mesh for baling (1).
Figure 2:
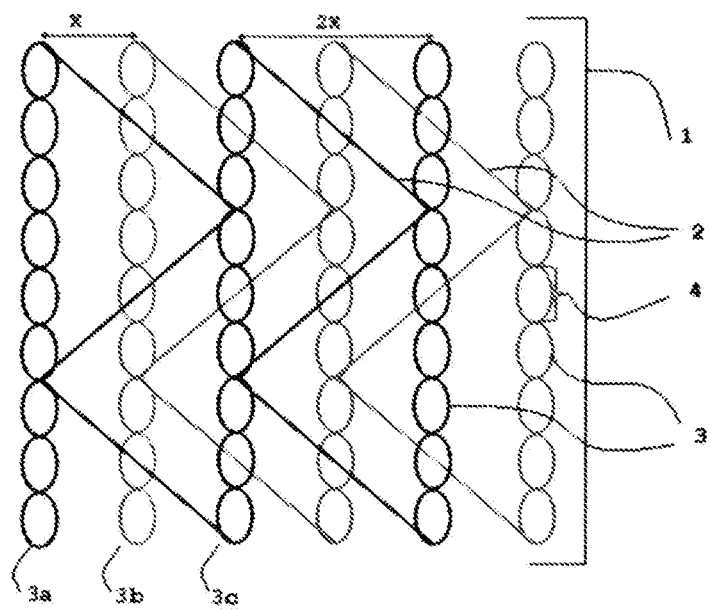
FIG. 2 shows the same perspective of the agricultural mesh for baling (1) shown in FIG. 1, where it can be seen, by way of example, the first column of chain or pillar (3a), the second column of chain or pillar (3b) and the third column of chain or pillar (3c) of the agricultural mesh for baling (1), wherein the distances between each two columns of chains or pillars (3) is X or 2X.
Figure 3:
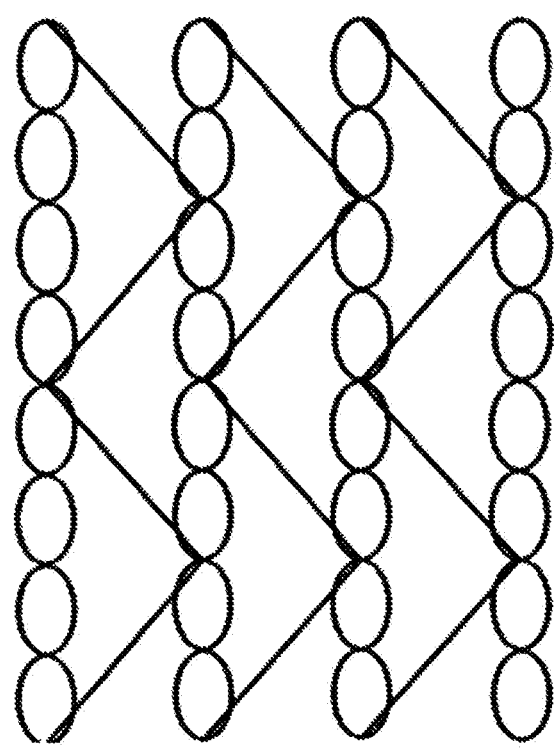
FIG. 3 shows a front view of a known common agricultural weft.
Figure 4:
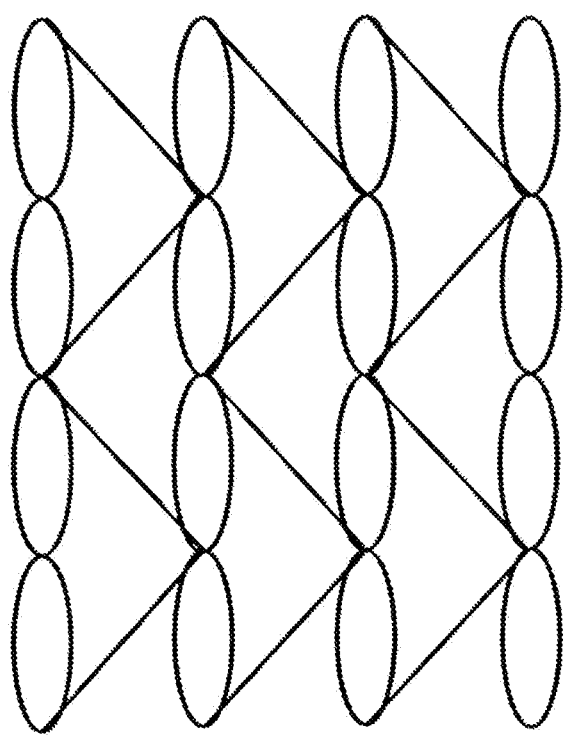
FIG. 4 shows another front view of a known common agricultural mesh.
Figure 5:
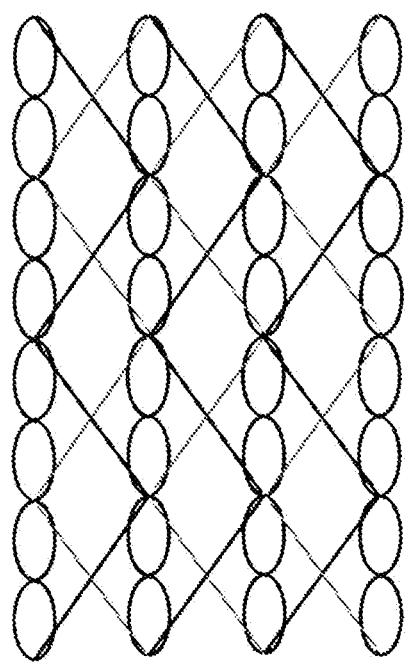
FIG. 5 shows yet another front view of a known common agricultural mesh having a cross-configuration.

The present invention relates to an agricultural mesh for baling (1) comprising a plurality of columns of chains or pillars (3) interconnected with each other by means of the weft (2) and wherein each column of chain or pillar (3) comprises a plurality of meshes (4).

For a better understanding of the present invention, it should be understood that the first column of chain or pillar (3a) relates to a first column of the agricultural mesh for baling (1). The second column of chain or pillar (3b) relates to the column of chain or pillar just after the first column of chain or pillar (3a) of the agricultural mesh for baling (1). The third column of chain or pillar (3c) relates to the column of chain or pillar just after the second column of chain or pillar (3b) of the agricultural mesh for baling (1). This configuration is repeated several times along the length of the agricultural mesh for baling (1).

The agricultural mesh for baling (1) has a triangular configuration, resulting from the interlacing of the weft (2) in a first column of chain or pillar (3a), passage through a second column of chain or pillar (3b), interlacing in a third column of chain or pillar (3c) and return to the first column of chain or pillar (3a) through the reverse longitudinal zigzag path with passage through the second column of chain or pillar (3b) and return to the first column of chain or pillar (3a), at intervals of six meshes (4), along the length of the agricultural mesh for baling (1).

Additionally, each weft (2) is initially interlaced in the columns of chains or pillars (3) at intervals of six meshes (4) along the length of the agricultural mesh for baling (1).

In addition, the weft (2) has a triangular shape resulting from the interlacing in the first column of chain or pillar (3a), passage through a second column of chain or pillar (3b), interlacing again in a third column of chain or pillar (3c) and return to the first column of chain or pillar (3a) through the reverse longitudinal zigzag path with passage through the second column of chain or pillar (3b), and return to the first column of chain or pillar (3a), at intervals of six meshes (4), along the length of the agricultural mesh for baling (1).

This process is repeated as many times as the sets of six meshes (4) existing along the length of the agricultural mesh for baling (1), resulting in a triangular configuration between the connection of weft (2) with each two columns of chains or pillars (3). This configuration takes the form of an equilateral triangle.

The columns of chains or pillars (3) that form the agricultural mesh for baling (1) have a distance between them enough to ensure the strength and cohesion of the agricultural mesh for baling (1) in the bales.

More particularly, the distance between columns of chains or pillars (3) that form the agricultural mesh for baling (1) is X, wherein X represents the minimum allowable distance between two columns of chains or pillars (3).

The minimum allowable distance between two columns of chains or pillars (3), X, can be defined as the ratio between the width of the roller of the agricultural mesh for baling (1) and the number of spacings between each two columns of chains or pillars (3) plus 1. Considering that the agricultural mesh for baling (1) has L columns of chains or pillars (3), we known that L corresponds to the number of spacings between two columns of chains or pillars (3) plus 1, referred to as R. To the number of spacings between two columns of chains or pillars (3) plus 1, R, correspond R spacings in the roller of the agricultural mesh for baling (1), due to the back-and-forth movement occurring in the winding phase of said agricultural mesh for baling (1).

In one embodiment, the distance between the columns of chains or pillars (3) that form the agricultural mesh for baling (1) is X.

In another embodiment of the present invention, the distance between columns of chains or pillars (3) that form the agricultural mesh for baling (1) is 2X, wherein 2X represents twice the minimum allowable distance between two columns of chains or pillars (3).

In the case where the distance between the columns of chains or pillars (3) that form the agricultural mesh for baling (1) is 2X, the distance between the columns of chains or pillars (3) is 100% higher when compared to the distance of columns of chains or pillars (3) in the case where the distance between the columns of chains or pillars (3) that form the agricultural mesh for baling (1), have a distance between them of X. In this latter case, although the distance between the columns of chains or pillars (3) is higher, it is ensured that the agricultural mesh for baling (1) remains intact and cohesive, without any breaking of the weft (2), which allows to produce even stronger bales, with a higher retention grade of the wrapped material.

The width of the agricultural mesh for baling (1) may have different values according to the type and dimensions of bale to be covered. The possible width values of the agricultural mesh for baling (1) are as follows: 50 cm, 66 cm, 80 cm, 90 cm, 99 cm, 100 cm, 105 cm, 123 cm, 125 cm, 130 cm, 163.5 cm, or 170 cm.

The materials that compose the agricultural mesh for baling (1) according to the present invention are selected from the following: high density polyethylene (homopolymer or metallocene), or polypropylene copolymers in a mass fraction up to 20%, or copolymers of polyethylene in a mass fraction up to 20%, or high-density polyethylene with polypropylene homopolymer in a mass fraction up to 20%.

EXAMPLES

Example 1

In one embodiment of the present invention, the agricultural mesh for baling (1) comprising columns of chains or pillars (3) spaced apart from each other in a distance X, wherein weft (2) is initially interlaced in the first column of chain or pillar (3a), interlaces in the third mesh (4) of the third column of chain or pillar (3c), interlaces again in the first column of chain or pillar (3a) in the reverse path, in a total distance of six meshes (4) in the first column of chain or pillar (3a). This process is repeated as many times as the sets of six meshes (4) existing along the length of the agricultural mesh for baling (1). Each column of chain or pillar (3) is formed of a yarn, and a bale with improved strength and cover is obtained.

Example 2

In a further embodiment of the present invention, the agricultural mesh for baling (1) comprising columns of chains or pillars (3) spaced apart from each other in a distance 2X, wherein the weft (2) is initially interlaced in the first column of chain or pillar (3a), passes through the second mesh (4) of the second column of chain or pillar (3b), interlacing in the third column of chain or pillar (3c) and interlacing again in the first column of chain or pillar (3a) in the reverse path, in a total distance of six meshes (4) in the first column of chain or pillar (3a). This process is repeated as many times as the sets of six meshes (4) existing along the length of the agricultural mesh for baling (1). Each column of chain or pillar (3) is formed by two yarns. Although the distance between the columns of chains or pillars (3) is the double, an even stronger bale with a higher degree of baled material is obtained, using the same amount of weft (2) as referred to in Example 1.

The invention claimed is:

1. An agricultural mesh for baling comprising a plurality of columns of chains or pillars, in which each column of chains or pillars comprises a plurality of meshes, with said columns of chains or pillars interconnected and associated by a weft, wherein said plurality of meshes has an equilateral triangle-configuration resulting from the interlacing of the weft in a first column of chains or pillars, passage through a second column of chains or pillars, interlacing in a third column of chains or pillars and return to the first column of chains or pillars through the longitudinal zigzag reverse path with passage through the second column of chains or pillars, and return to the first column of chains or pillars at intervals of six meshes along the length of the agricultural mesh for baling.

2. The agricultural mesh according to claim 1, wherein the columns of chains or pillars that form the agricultural mesh for baling have a distance between them defined as the ratio of the width of the roller of the agricultural mesh for baling and the number of spacings between each two columns of chains or pillars plus 1.

3. The agricultural mesh according to claim 1, wherein the materials comprising the agricultural mesh for baling are selected from the following:

high density polyethylene (homopolymer or metallocene), or polypropylene copolymers in a mass fraction up to 20%, or polyethylene copolymers in a mass fraction up to 20%, or high-density polyethylene with polypropylene homopolymer in a mass fraction up to 20%.

* * * * *